United States Patent
Mollhagen

(10) Patent No.: US 7,213,539 B1
(45) Date of Patent: May 8, 2007

(54) APPARATUS FOR MOVING LIVESTOCK

(76) Inventor: Jon Davis Mollhagen, Rte. 1, Box 63, Lorraine, KS (US) 67459

( * ) Notice: Subject to any disclaimer, the term of this patent is extended or adjusted under 35 U.S.C. 154(b) by 292 days.

(21) Appl. No.: 10/960,906

(22) Filed: Oct. 10, 2004

Related U.S. Application Data

(60) Provisional application No. 60/510,388, filed on Oct. 10, 2003.

(51) Int. Cl.
*A01K 29/00* (2006.01)
(52) U.S. Cl. ...................................... 119/843
(58) Field of Classification Search ............... 119/843, 119/510, 703, 704
See application file for complete search history.

(56) References Cited

U.S. PATENT DOCUMENTS

| | | | | |
|---|---|---|---|---|
| 3,805,741 A | * | 4/1974 | Thompson et al. | 119/510 |
| 4,452,178 A | * | 6/1984 | Nijhuis | 119/510 |
| 6,209,492 B1 | * | 4/2001 | Rankin | 119/843 |
| 6,213,056 B1 | * | 4/2001 | Bergmann et al. | 119/704 |
| 2003/0213439 A1 | * | 11/2003 | Haring | 119/704 |
| 2005/0161001 A1 | * | 7/2005 | Kildegaard | 119/510 |

* cited by examiner

*Primary Examiner*—Thomas Price
(74) *Attorney, Agent, or Firm*—Robert O. Blinn

(57) ABSTRACT

An apparatus for urging livestock animals includes at least one alleyway which is defined by a frame having a stationary portion and a reciprocating portion. The reciprocating portion includes a paddle assembly including spaced pairs of pivtobably mounted paddles. The reciprocating frame swings between a rear position and a forward position. The paddles are mounted to the reciprocating frame such that the paddles may pivot forward but not backward to permit forward motion of a livestock animal and to apply force to the hind quarters of the livestock animal when the reciprocating frame moves forward or to prevent rearward movement of the livestock animal in the alleyway.

12 Claims, 5 Drawing Sheets

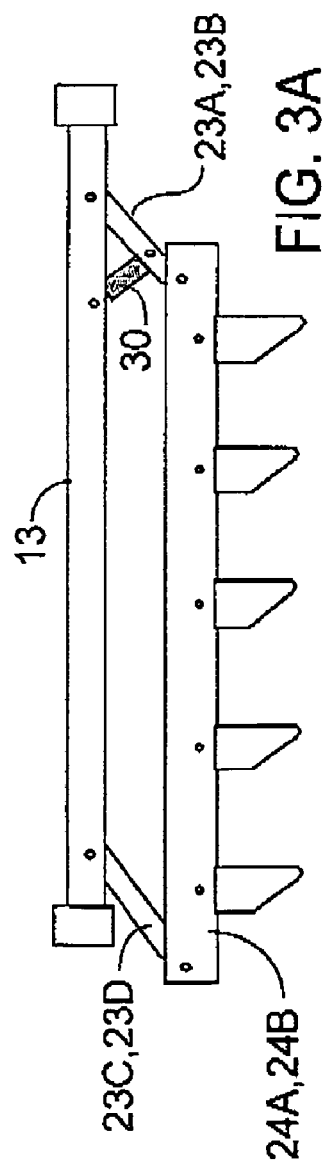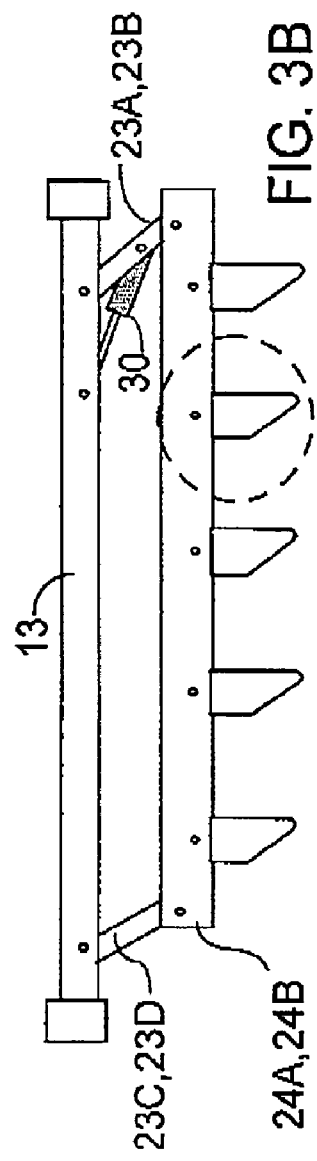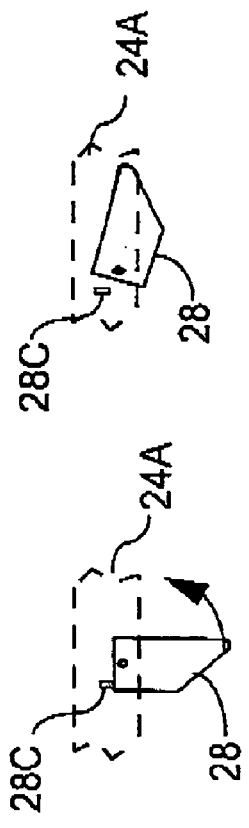

APPARATUS FOR MOVING LIVESTOCK

CROSS REFERENCES TO RELATED APPLICATIONS

This application claims the benefit of U.S. Provisional Patent Application No. 60/510,388 filed Oct. 10, 2003.

FIELD OF THE INVENTION

The present invention relates to an apparatus for urging cattle through an alleyway.

BACKGROUND OF THE INVENTION

Specialized trailers or transportable units having alleyways and a squeeze chute have long been used to conduct livestock through a procedure such as vaccination. A primary objective of such units is to move livestock through alleyways and squeeze chutes as quickly as possible without harming or over-stressing the livestock. Traditional methods for motivating cattle to move through alleyways tend to subject cattle to significant stress. Typically, a veterinarian receiving livestock animals from an alleyway into a squeeze chute for procedures such as vaccinations would much rather work with a relatively calm, unstressed animal. Accordingly, what is needed is an apparatus for gently and efficiently urging livestock through an alleyway while inducing a minimum of stress.

SUMMARY OF THE INVENTION

The livestock urging apparatus of the present invention gently and efficiently urges livestock through an alleyway. The livestock urging apparatus includes at least one alleyway which is defined by a frame and includes an entrance portion and an exit portion. A paddle assembly is mounted to the alleyway frame. The paddle assembly includes a generally horizontal reciprocating frame, pivot links connecting the reciprocating frame and the alleyway frame and a pattern of spaced pairs of paddles individually and pivotably mounted to the reciprocating frame. The reciprocating frame swings generally within the alleyway frame between a rear position and a forward position. The reciprocating frame is positioned high enough to provide vertical clearance for the passage of a livestock animal. The paddles have generally vertical, flat leading surfaces for pushing the hind quarters of a livestock animal and angled trailing surfaces for facilitating the forward motion of a livestock animal. The paddles are mounted to the reciprocating frame such that the paddles may pivot from a vertical orientation toward a horizontal orientation in a forward direction as the livestock animal pushes upon the angled trailing surfaces of the paddles from behind so as to allow the forward passage of the livestock animal. Yet, the paddles are also mounted such that the paddles do not pivot in a backward direction from the vertical orientation so that the paddles may be used to push a livestock animal from behind. An actuator connects between the paddle assembly and the alleyway frame for actuating the reciprocating motion of the paddle assembly. In the preferred embodiment, the actuator is a hydraulic cylinder which can be operated manually or even remotely as an operator urges cattle through the alleyway. Two alleyways each having a paddle assembly can be arranged in a side by side manner so that livestock animals such as cattle may be urged in an alternating fashion into a single receiving chute. With this arrangement, cattle may be urged through an area or into a squeeze chute very rapidly.

BRIEF DESCRIPTION OF THE DRAWINGS

FIG. 3A is a side view of a paddle assembly in the rear position.

FIG. 3B is a side view of a paddle assembly in the forward position.

FIG. 4A is a side view of a single paddle hanging in a vertical orientation.

FIG. 4B is a side view of a single paddle rotated toward a horizontal orientation.

DETAILED DESCRIPTION

Figure 1:
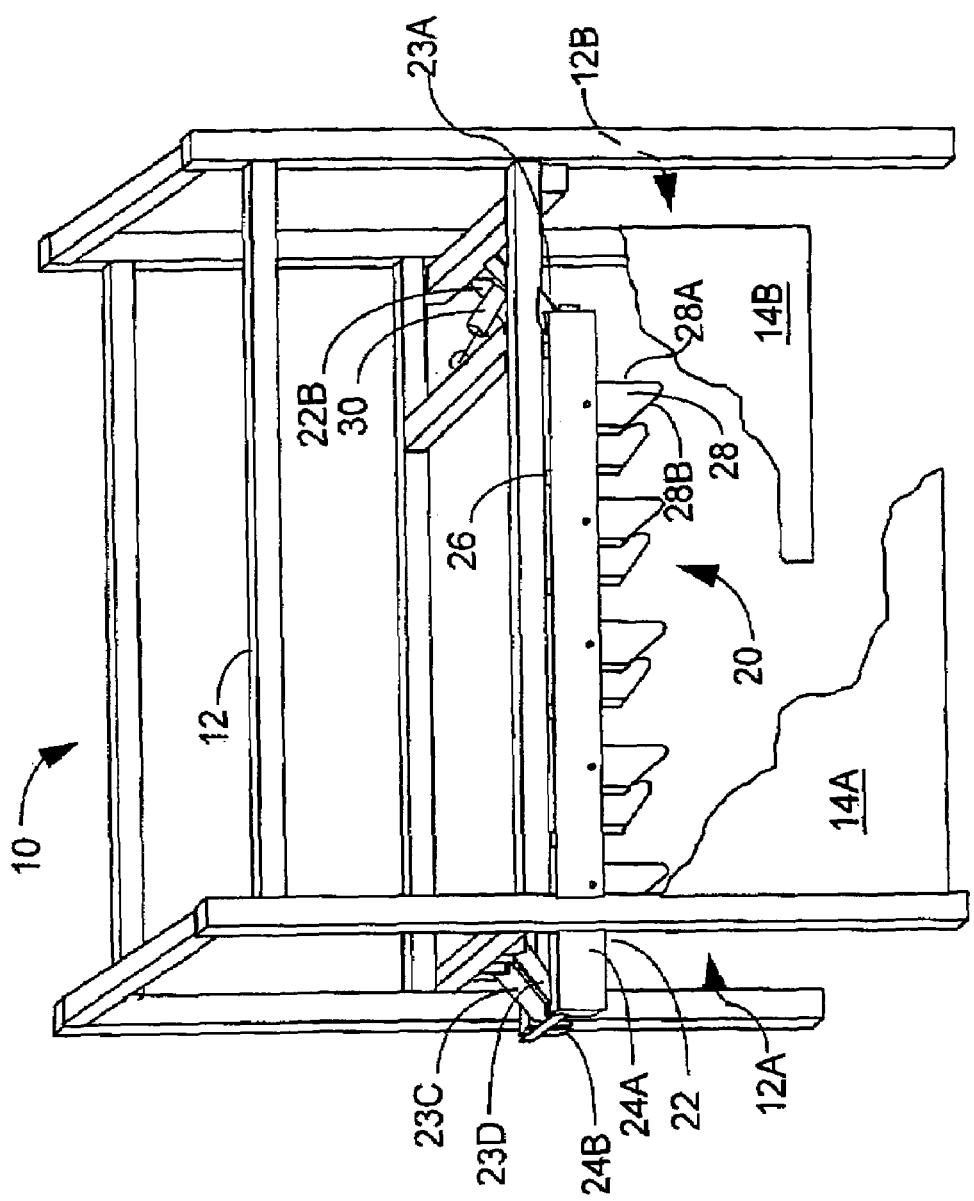
FIG. 1 is a perspective view of the livestock urging apparatus of the present invention showing a single alleyway and a single paddle assembly.

Referring to the drawings, FIG. 1 illustrates FIG. 1 illustrates a livestock urging apparatus 10 including an alleyway defined by a frame 12 and a paddle assembly 20.

The alleyway includes an entrance portion 12A and an exit portion 12B. The alleyway is defined by alleyway frame 12 and is enclosed on both sides by panels 14A and 14B shown in a cut-away fashion in FIGS. 1 and 2. Paddle assembly 20 includes a reciprocating frame 22 which is mounted to the alleyway frame 12 by a set of generally parallel pivot links 23A, 23B, 23C and 23D. Pivot links 23A, 23B, 23C and 23D are arranged so that frame 22 maintains a generally horizontal orientation as it swings back and forth. Reciprocating frame 22 includes left and right longitudinal members 24A and 24B and a pattern of transverse members 26 connecting left and right longitudinal members 24A and 24B for completing a rigid frame structure. A pattern of pivotably mounted spaced pairs of paddles 28 hang beneath reciprocating frame 22. Reciprocating frame 22 swings between a rear position and a forward position generally within the alleyway frame 12 as shown in FIGS. 3A and 3B. Reciprocating frame 22 is positioned high enough to provide vertical clearance for the passage of a livestock animal as shown in FIG. 2.

Figure 2:
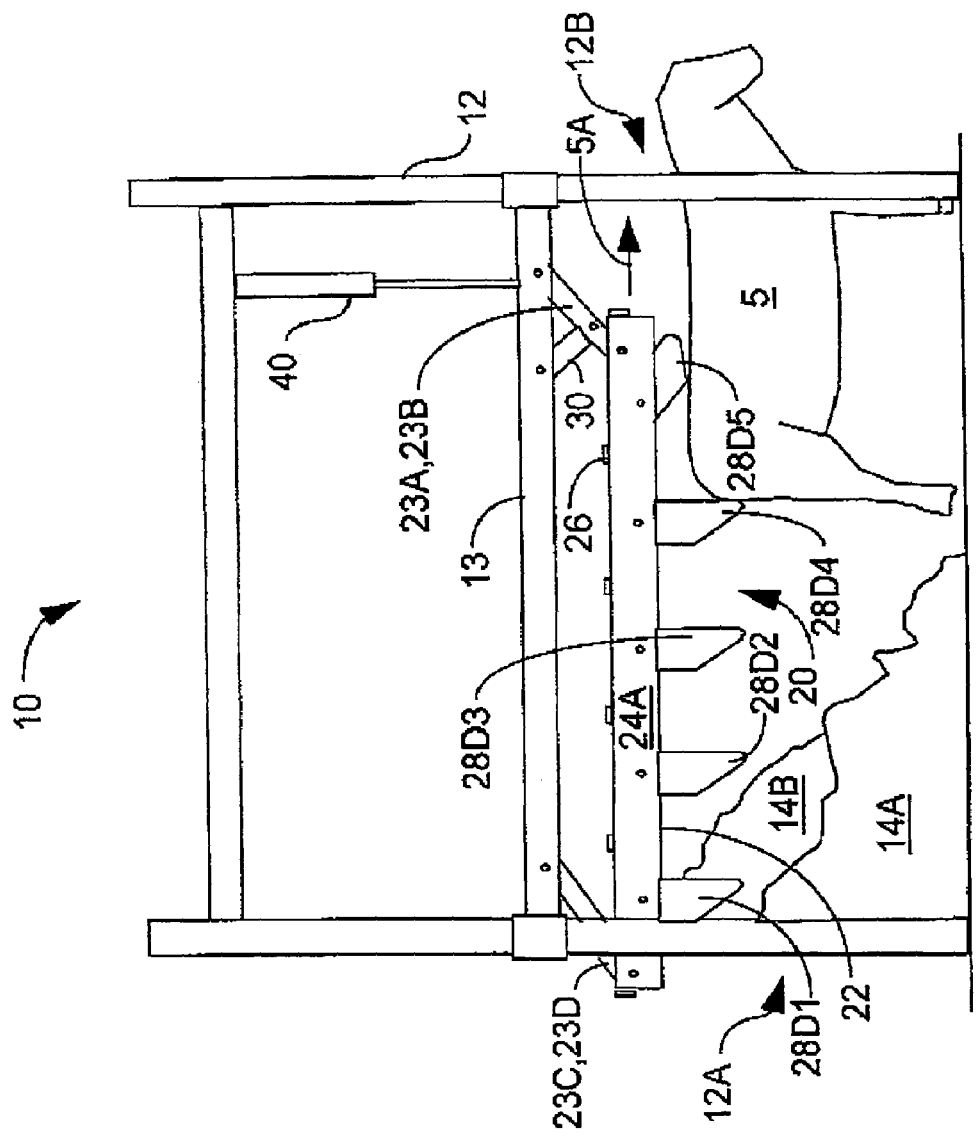
FIG. 2 is a side view of the livestock urging apparatus of the present invention showing a single alleyway and a single paddle assembly urging a livestock animal.

Paddles 28 are designed to rotate up and forward (or counter-clockwise as seen in FIG. 2) to permit forward passage of a livestock animal. Further, paddles 28 are mounted to reciprocating frame 22 such that they can not rotate in a backward direction (clockwise as seen in FIG. 2). Paddles 28 are generally flat and are oriented such that their largest flat surfaces are oriented in a longitudinal direction or generally parallel to reciprocating frame 22. Paddles 28 have generally flat forward surfaces 28A for pushing the hind quarters of a livestock animal and angled rear surfaces 28B for facilitating the forward motion of a livestock animal. Paddles 28 are mounted to the reciprocating frame such that paddles 28 may pivot in a forward or clockwise direction from the vertical orientation shown in FIG. 4A toward the retracted position shown in FIG. 4B. This forward pivoting motion allows a livestock animal to push upon the angled rear surfaces 28B of paddles 28 from behind so as to allow the forward passage of the livestock animal. Yet, paddles 28 are also mounted to reciprocating frame 22 such that paddles 28 can not pivot clockwise as seen from the vantage point of FIG. 2A.

FIGS. 4A and 4B illustrate the motion of a single paddle 28 between a vertical orientation and a retracted orientation. A boss 28C for preventing the counter-clockwise rotation of paddle 28 projects from left longitudinal member 24A of reciprocating frame 22. Those skilled in the art will quickly appreciate that any one of a number of mechanical arrangements can be chosen for preventing the counter clockwise rotation of paddle 28. Paddle 28 is shaped to permit the passage of an animal as it passes beneath a set of rotating paddles. As noted above, paddle 28 includes a flat forward surface 28A for pushing a livestock animal and an angled rear surface 28B which facilitates the passage of an animal as it moves from left to right as seen in FIGS. 4A and 4B.

FIG. 2 illustrates a livestock animal 5 being pushed by urging apparatus 10. As can be seen in FIG. 2, a pair of paddles 28D4 contacts the hind quarters of the livestock animal while a second pair of paddles 28D5 are retracted (or rather pushed up and out of the way by livestock animal 5) in order to provide clearance for livestock animal 5. As paddle assembly 20 translates forward, paddle pair 28D4 pushes livestock animal in the direction indicated by arrow 5A. After livestock animal 5 moves forward, paddle assembly 20 moves back to the rear position and the paddles of paddle pair 28D5 return to the vertical orientation of paddle pair 28D4. When the paddles of paddle pair 28D5 are in the vertical orientation, they are then available to push livestock animal 5 as paddle assembly 20 executes a subsequent stroke. The paddles operate in this sequential manner as the animal proceeds under the paddles and is pushed through the alleyway by reciprocating paddle assembly 20. This provides a relatively gentle and painless method for sequencing cattle in two side by side alleyways which are each equipped with an urging apparatus 10 into a squeeze chute.

Urging apparatus 10 shown in FIG. 2 includes an optional means for retracting paddle assembly into a raised, non-operating position. In FIG. 2, paddle assembly 20 is mounted to a translating portion 13 of frame 12 that is slidably mounted to the stationary portion of frame 12. A hydraulic cylinder 40 connects translating portion 13 and the stationary portion of frame 12. When hydraulic cylinder 40 retracts, paddle assembly 20 retracts away from livestock animal 5. This arrangement may also be used to adjust the operating level of paddle assembly 20 in order to accommodate animals of different sizes.

As can be best seen in FIGS. 3A and 3B, a hydraulic cylinder 30 connects between a portion of paddle assembly 20 and the alleyway frame 12. Hydraulic cylinder 30 actuates the reciprocating motion of the paddle assembly 20. The motion of paddle assembly 20 is shown in FIGS. 3A and 3B. In FIG. 3A, hydraulic cylinder 30 is retracted and paddle assembly 20 is in the rear position. In FIG. 3B, hydraulic cylinder 30 is extended and paddle assembly 20 is in the forward position.

FIGS. 4A and 4B illustrate the motion of a single paddle 28 between a vertical orientation and a retracted orientation. Protruding from left longitudinal member 24A is a boss 28C for preventing the clockwise rotation of paddle 28. Those skilled in the art will quickly appreciate that any one of a number of mechanical arrangements can be chosen for preventing the counter clockwise rotation of paddle 28. As noted above, the shape of paddle 28 is adapted to permit the passage of an animal as it passes beneath a set of rotating paddles. Paddle 28 includes a flat forward surface for pushing a livestock animal and an angled rear surface which facilitates the passage of an animal as it moves from right to left as seen in FIGS. 4A and 4B.

Figure 5:
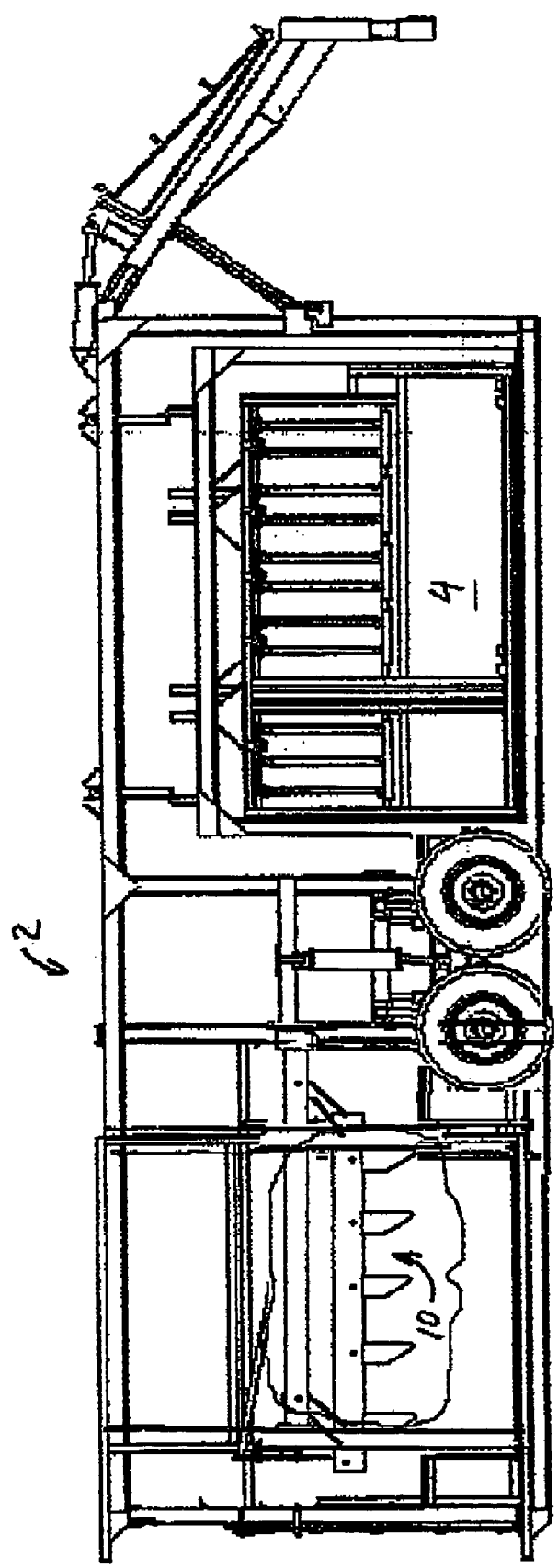
FIG. 5 is a side view of a livestock urging apparatus installed within a trailer having two alleyways leading to a single squeeze chute.
Figure 6:
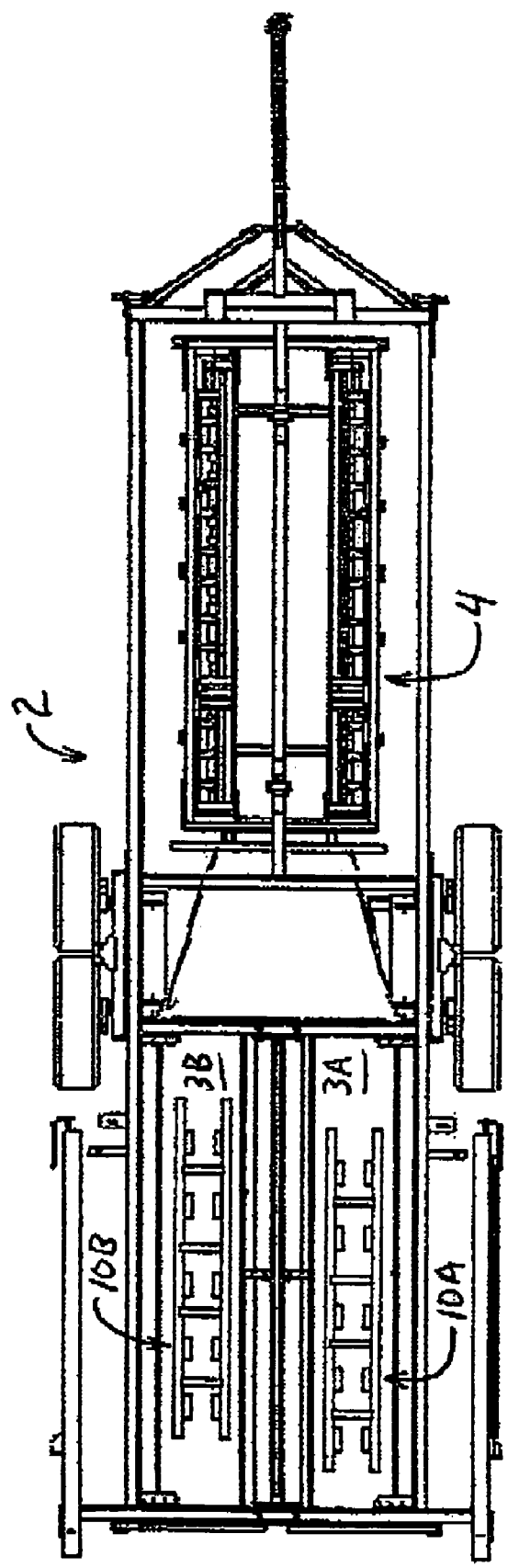
FIG. 6 is a top view showing two livestock urging apparatuses installed within a trailer in a side by side fashion in adjacent alleyways leading to a single squeeze chute.

FIGS. 5 and 6 show two side by side animal urging apparatuses 10A and 10B installed in a trailer 2. Trailer 2 includes two alleyways 3A and 3B for presenting cattle to a single squeeze chute 4. Trailer 2 is used to process cattle through a procedure such as vaccination. The general object would be to move cattle through such a process or procedure as rapidly as possible while subjecting each animal to as little stress as possible. The installation of urging apparatuses 10A and 10B within alleyways 3A and 3B provides a way to move cattle through trailer 2 as rapidly as possible. Typical hydraulic controls can be used to actuate the hydraulic cylinders of apparatuses 10A and 10B so that the reciprocation each paddle assembly can be controlled by an operator. A remote control capability can be easily added so that an operator located away from the apparatus may activate the urging of cattle through an alleyway.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for urging a livestock animal through an enclosed alleyway, comprising:
  (a) an alleyway frame having an entrance for receiving livestock, an exit for discharging livestock and a longitudinal passageway extending between said entrance and said exit,
  (c) a reciprocating frame mounted to said alleyway frame for reciprocating generally longitudinal movement relative to the alleyway between a first rear position and a second forward position,
  (d) a plurality of longitudinally spaced paddles mounted to said reciprocating frame for forward pivoting movement between a first depending, generally vertical position and a second generally horizontal forward position, such that said paddles may pivot up and forward to allow forward movement of a livestock animal through said alleyway, said paddles also mounted to said reciprocating frame such that said paddles do not pivot in a backward direction from said first depending, generally vertical position thereby obstructing the backward movement of livestock in the alleyway, whereby livestock in said alleyway may be urged in a forward direction with reciprocating movement of said reciprocating frame as at least one of said plurality of paddles urge the livestock from behind in a forward direction.

2. The apparatus of claim 1 further comprising, an actuator for powering said reciprocating motion of said reciprocating frame relative to said alleyway frame.

3. The apparatus of claim 1 wherein, each of said plurality of paddles includes an angled rear surface and a substantially vertical forward surface.

4. An apparatus for urging a livestock animal through an enclosed alleyway, comprising:
  (a) an alleyway frame having an entrance for receiving livestock, an exit for discharging livestock and a longitudinal passageway extending between said entrance and said exit,
  (c) a reciprocating frame mounted to said alleyway frame for reciprocating generally longitudinal movement relative to the alleyway between a first rear position and a second forward position, said reciprocating frame also mounted to said alleyway frame for generally vertical movement between a first lowered, operating position and a second, raised, non-operating position, (d) a plurality paddles mounted to said reciprocating frame for forward pivoting movement between a first depending, generally vertical position and a second generally horizontal forward position, such that said paddles may pivot up and forward to allow forward movement of a livestock animal through said alleyway, said paddles also mounted to said reciprocating frame such that said paddles do not pivot in a backward direction from said first depending, generally vertical position thereby obstructing the backward movement of livestock in the alleyway, whereby livestock in said alleyway may be urged in a forward direction with reciprocating movement of said reciprocating frame as at least one of said plurality of paddles urge the livestock from behind in a forward direction.

5. The apparatus of claim 4 wherein, said alleyway frame further includes a stationary portion and a translating portion, said translating portion for movement relative to said stationary portion between said first, lowered, operating position and said second raised non-operating position.

6. The apparatus of claim 4 wherein, said alleyway further comprises an alleyway frame and said alleyway frame further includes a stationary portion and a translating portion, said translating portion slidably mounted to said stationary portion for movement relative to said stationary portion between said first, lowered, operating position and said second raised non-operating position, and wherein said reciprocating frame is connected to said translating portion of said alleyway frame by pivot links for reciprocating generally longitudinal movement relative to said translating portion of said alleyway frame between a first rear position and a second forward position.

7. The apparatus of claim 4 wherein, each of said plurality of paddles includes an angled rear surface and a substantially vertical forward surface.

8. An apparatus for urging a livestock animal through an enclosed alleyway, comprising:

(a) an alleyway frame having an entrance for receiving livestock, an exit for discharging livestock and a longitudinal passageway extending between said entrance and said exit, said alleyway frame including a stationary portion and a translating portion mounted to said stationary portion for generally vertical motion between a lowered, operating position and a raised non-operating position, (c) a reciprocating frame mounted to said translating portion of said alleyway frame for reciprocating generally longitudinal movement relative to the alleyway between a first rear position and a second forward position, (d) a plurality paddles mounted to said reciprocating frame for forward pivoting movement between a first depending, generally vertical position and a second generally horizontal forward position, such that said paddles may pivot up and forward to allow forward movement of a livestock animal through said alleyway, said paddles also mounted to said reciprocating frame such that said paddles do not pivot in a backward direction from said first depending, generally vertical position thereby obstructing the backward movement of livestock in the alleyway, whereby livestock in said alleyway may be urged in a forward direction with reciprocating movement of said reciprocating frame as at least one of said plurality of paddles urge the livestock from behind in a forward direction.

9. The apparatus of claim 8 further comprising, a hydraulic cylinder connecting between said translating portion of said alleyway frame and said reciprocating frame for powering reciprocating movement of said reciprocating frame.

10. The apparatus of claim 8 further comprising, a hydraulic cylinder connecting between said stationary portion of said alleyway frame and said translating portion of said alleyway frame powering reciprocating movement of said translating portion of said alleyway frame.

11. The apparatus of claim 8 further comprising, (a) a hydraulic cylinder connecting between said translating portion of said alleyway frame and said reciprocating frame for powering reciprocating movement of said reciprocating frame, and (b) a hydraulic cylinder connecting between said stationary portion of said alleyway frame and said translating portion of said alleyway frame powering reciprocating movement of said translating portion of said alleyway frame.

12. The apparatus of claim 8 wherein, each of said plurality of paddles is generally flat and oriented in a longitudinal direction and includes an angled rear surface and a substantially vertical forward surface.

\* \* \* \* \*